(12) United States Patent
Whitney Gnadinger et al.

(10) Patent No.: US 12,121,177 B2
(45) Date of Patent: Oct. 22, 2024

(54) SYSTEM AND METHOD FOR DISPENSING PRECISE TEMPERATURE CONTROLLED HOT WATER

(71) Applicant: Tea Unwrapped LLC, Noblesville, IN (US)

(72) Inventors: Errin Whitney Gnadinger, Louisville, KY (US); Benjamin L. Martin, Louisville, KY (US); Robert L. Lewis, Jr., Louisville, KY (US); Grayson Paul Newland, New Albany, IN (US); Dean Paul Haviland, Lousiville, KY (US); Max Bock-Aronson, Minneapolis, MN (US); Cheryl E. Watson, Noblesville, IN (US); Dan Johnson, Minneapolis, MN (US); Eric Krause, Minneapolis, MN (US); Todd Matthew Squires, Bull Valley, IL (US)

(73) Assignee: Tea Unwrapped LLC, Noblesville, IN (US)

( * ) Notice: Subject to any disclaimer, the term of this patent is extended or adjusted under 35 U.S.C. 154(b) by 1029 days.

(21) Appl. No.: 16/949,455

(22) Filed: Oct. 29, 2020

(65) Prior Publication Data

US 2021/0038017 A1 Feb. 11, 2021

Related U.S. Application Data

(63) Continuation of application No. PCT/US2019/032774, filed on May 17, 2019.
(Continued)

(51) Int. Cl.
*A47J 31/46* (2006.01)
*A47J 31/40* (2006.01)
(Continued)

(52) U.S. Cl.
CPC ............ *A47J 31/461* (2018.08); *A47J 31/402* (2013.01); *A47J 31/465* (2013.01); *A47J 31/468* (2018.08);
(Continued)

(58) Field of Classification Search
CPC ...... A47J 31/461; A47J 31/469; A47J 31/468; A47J 31/402; A47J 31/465; A47J 31/56; B67D 1/0884; B67D 2210/00118
(Continued)

(56) References Cited

U.S. PATENT DOCUMENTS 3,634,107 A * 1/1972 Cornelius ............... A47J 31/40
99/275
4,550,651 A * 11/1985 Haynes ................. A47J 31/467
426/433
(Continued)

FOREIGN PATENT DOCUMENTS

CN 101063573 A * 10/2007 ........... B67D 1/0857
CN 106820976 A 6/2017
(Continued)

OTHER PUBLICATIONS

English abstract for CN 106820976 A obtained from Google Patents on Mar. 17, 2023.
(Continued)

*Primary Examiner* — Jimmy Chou
(74) *Attorney, Agent, or Firm* — Woodard, Emhardt, Henry, Reeves & Wagner, LLP; William A. McKenna (57) ABSTRACT

A dispenser for dispensing a selected volume of water at a specified temperature. The dispenser includes a source of water at an elevated temperature and a source of water at a lower temperature. An electronic controller determines the volume of water needed from each source in order to arrive at the selected volume and temperature. The dispenser uses
(Continued)

a recirculation valve to circulate at least the elevated temperature water in the tank and in the outlet in order to ensure the temperature of the water is as expected throughout the system to achieve the specified temperature.

18 Claims, 10 Drawing Sheets

Related U.S. Application Data (60) Provisional application No. 62/673,295, filed on May 18, 2018.

(51) Int. Cl.
*A47J 31/56* (2006.01)
*B67D 1/08* (2006.01)

(52) U.S. Cl.
CPC ............. *A47J 31/469* (2018.08); *A47J 31/56* (2013.01); *B67D 1/0884* (2013.01); *B67D 2210/00118* (2013.01)

(58) Field of Classification Search
USPC .......................................................... 99/281
See application file for complete search history.

(56) References Cited

U.S. PATENT DOCUMENTS

| | | | | |
|---|---|---|---|---|
| 4,791,860 | A * | 12/1988 | Verheijen | A47J 31/402 99/275 |
| 4,792,059 | A * | 12/1988 | Kerner | B67D 3/00 222/144.5 |
| 5,042,689 | A * | 8/1991 | Mrugala | G01F 23/162 222/66 |
| 5,584,229 | A * | 12/1996 | Anson | A47J 31/465 99/280 |
| 5,975,365 | A * | 11/1999 | Hsieh | A47J 31/40 222/146.6 |
| 6,250,558 | B1 * | 6/2001 | Dogre Cuevas | G05D 23/1393 236/94 |
| 6,254,790 | B1 * | 7/2001 | King | A47J 37/1223 210/767 |
| 6,460,735 | B1 * | 10/2002 | Greenwald | A47J 31/467 222/145.5 |
| 6,632,347 | B1 * | 10/2003 | Buckley | A61P 43/00 205/345 |
| 7,401,545 | B2 * | 7/2008 | Hu | A47J 31/3604 99/280 |
| 7,458,520 | B2 * | 12/2008 | Belz | G05D 23/1393 236/12.12 |
| 8,127,662 | B2 * | 3/2012 | Nijboer | A47J 31/40 99/275 |
| 8,225,961 | B2 | 7/2012 | Anson | |
| 8,695,481 | B2 * | 4/2014 | Carbonini | A47J 31/469 99/279 |
| 10,506,893 | B2 * | 12/2019 | Thakkar | A23F 3/18 |
| 2002/0013137 | A1 * | 1/2002 | Asam | H03D 7/1458 455/318 |
| 2002/0130137 | A1 * | 9/2002 | Greenwald | A47J 31/467 99/290 |
| 2006/0042470 | A1 * | 3/2006 | Anson | G05D 23/1393 99/275 |
| 2006/0292012 | A1 * | 12/2006 | Brudevold | A47J 31/402 417/53 |
| 2009/0240363 | A1 * | 9/2009 | Hughes | G05D 11/139 715/833 |
| 2012/0219686 | A1 * | 8/2012 | Bombeck | A23F 3/18 426/431 |
| 2013/0032036 | A1 * | 2/2013 | Zhong | A47J 31/5255 99/294 |
| 2013/0156903 | A1 * | 6/2013 | Bombeck | A47J 31/30 99/292 |
| 2013/0220137 | A1 * | 8/2013 | Bombeck | A47J 31/54 99/287 |
| 2015/0144000 | A1 * | 5/2015 | Burton-Wilcock | A47J 31/525 99/295 |
| 2016/0007798 | A1 * | 1/2016 | Jimenez | A47J 31/56 99/283 |
| 2016/0360919 | A1 * | 12/2016 | Burrows | A47J 31/407 |
| 2016/0368752 | A1 * | 12/2016 | Bethuy | B67D 1/0869 |
| 2016/0368753 | A1 * | 12/2016 | Bethuy | A47J 31/4403 |
| 2017/0273498 | A1 * | 9/2017 | Singh | A47J 31/56 |
| 2017/0290458 | A1 * | 10/2017 | Burrows | A47J 31/3628 |
| 2018/0098658 | A1 * | 4/2018 | Angell | A47J 31/44 |
| 2018/0371385 | A1 * | 12/2018 | Hong | B67D 1/0016 |
| 2019/0100444 | A1 * | 4/2019 | Black | C02F 1/686 |
| 2021/0038017 | A1 * | 2/2021 | Gnadinger | B67D 1/0004 |

FOREIGN PATENT DOCUMENTS

| | | | |
|---|---|---|---|
| CN | 206371877 U | 8/2017 | |
| JP | H 05161547 A | 6/1993 | |
| JP | H 07303565 A | 11/1995 | |
| JP | H 1156635 A | 3/1999 | |
| KR | 10-2009-0043785 A | 5/2009 | |
| KR | 20090043785 A * | 5/2009 | ........... B67D 1/0884 |
| WO | WO 2010/119438 A1 | 10/2010 | |

OTHER PUBLICATIONS

English abstract for JP H 05161547 A obtained from Google Patents on Mar. 17, 2023.
English abstract for JP H 1156635 A obtained from Google Patents on Mar. 15, 2023.
English abstract of CN 206371877 U obtained from Google Patents on Mar. 28, 2022.
Written Opinion and Search Report from PCT application No. PCT/US2019/032774 dated Aug. 27, 2019 (12 pages).
English abstract of CN 101063573 A obtained from Google Patents on Jan. 4, 2023, 13 pages.

* cited by examiner

SYSTEM AND METHOD FOR DISPENSING PRECISE TEMPERATURE CONTROLLED HOT WATER

CROSS REFERENCE TO RELATED APPLICATIONS

The present application claims the benefit of U.S. Provisional Patent Application Ser. No. 62/673,295 filed May 18, 2018 entitled "SYSTEM AND METHOD FOR DISPENSING PRECISE TEMPERATURE CONTROLLED HOT WATER" which is hereby incorporated by reference in its entirety to the extent not inconsistent.

FIELD OF THE INVENTION

Aspects of the present disclosure relate to a precisely controlled water dispenser which may be used independently or combined with a container and dispenser for storing and dispensing loose materials, such as coffee, tea, powder, or other like materials for preparing beverages.

BACKGROUND OF THE INVENTION

Beverages are a growing part of the restaurant industry, with many successful restaurants and/or chains selling principally beverages, such as coffee, milkshakes, smoothies, or the like. Many manufacturers provide equipment for increasing the quality and consistency of these beverages as well as to assist in shortening the point-of-sale production time required for these beverages.

Complex and sophisticated systems exist for dispensing cold beverages, such as sodas, as well as frozen beverages, such as slushies and the like. However, very few if any systems exist which are capable of dispensing hot water at a precise temperature in conjunction with one or more loose materials such as tea, powder, coffee or the like.

The traditional method of making a cup of tea is to place loose tea leaves, either directly or in a tea infuser, into a tea pot or teacup and pour hot water over the leaves. After a few minutes the leaves are usually removed again, either by removing the infuser, or by straining the tea while serving. Still today, this process commonly occurs by the collection and measurement of the appropriate amount of loose-leaf tea by hand. However, due to the time required, tea is often served only in more relaxed environments as its production is not conducive to speed.

In an attempt to expedite and/or bring convenience to the process, the tea bag was developed, which contains a pre-determined amount of tea and is used to create a common sized beverage, such as 8 ounces. However, given their method of manufacture, tea bags are a lesser preferred option to fresh tea, as the tea spends quite some time in storage and transit prior to being delivered for use. Furthermore, tea bags do not lend themselves easily to the production of teas of varying quantities, such as 8 ounces, 12 ounces, a full tea pot or a bulk bag. Subsequently, "pods" or "cups" were developed which are used in automated machines; however, these pods suffer from the same problems as using tea bags. While some hot water dispensers exist, when the potential to dispense hot water for a variety of beverages is present, the need for precisely controlled temperature across a range of temperatures is desired. For example, various types of teas may require different temperature of hot water for proper preparation. With the exception of water, tea is the most consumed beverage in the world. Accordingly, a need exists for a dispenser capable of dispensing the proper amount of water at the prescribed temperature for the selected tea in order to provide rapid ready for consumer beverages. In a further form, the dispenser may also precisely dispense the tea or other loose material for the beverage as well.

Accordingly, the present invention solves a number of these problems as well as other problems present in the hot beverage dispensing industry, as are illustrated in the descriptions that follow.

SUMMARY OF THE INVENTION

The present invention involves various aspects of a container and/or dispenser for use in selectively dispensing numerous types of loose materials, such as dry products, and precisely controlled hot water, including both temperature and volume. Suitable dry products for use with the novel dispenser disclosed herein include one or more varieties of tea, spices, coffee, dried foods, other powders and the like. For purposes of illustration, the container and dispenser described herein shall be described with respect to the dispensing of loose leaf tea. However, it shall be appreciated that the system could be easily applied to other loose materials, such as, but not limited to, those listed above. In one further form, the dispenser may include a coin/bill acceptor and/or credit card terminal or like device for use as a vending machine, in another form, electronic payments such as mobile payments, room keys or fobs for making a room charge, or other types of commonly used and/or know payment methods may be provided for.

An illustrative embodiment of the present invention is a loose leaf tea system including a plurality of containers and dispenser as well as a hot water dispenser. The tea containers each serve to store a given variety of tea leaves or grounds prior to activation of the system. Upon activation, the dispenser positions the selected tea container, measures and loads a selected amount of that variety of tea into a hopper for dispensing, such as into a waiting cup, tea pot, or a tea infuser, and also dispenses the appropriate amount of hot water at the proper temperature for the selected type and volume of tea. The amount of tea and volume of water may be selected based upon user operation of one of a number of quantity indicating/selection buttons provided in a user interface or may be otherwise input by the user, such as by rotating a dial or pushing a button or lever. The temperature of the hot water may be programmed into the dispenser for each variety of tea based upon tea expert recommendations and/or the user may be able to input the temperature or modify the recommendation based upon their personal preferences. The container is preferably a sealed canister, such as a blow molded opaque container, which is sealed when positioned on the dispenser so as to not expose the material contained to light, air and/or moisture. Below the opening in each container a mechanism is provided for loading the tea into a measuring hopper below. Each mechanism preferably seals when not in use so as to prevent the tea in the container from coming into contact with the outside atmosphere prior to entering the hopper below. Furthermore, the dispenser is able to operate the mechanism such that it loads a desired amount of tea (e.g. by weight), specified by the user, into the hopper. Once the desired amount of tea is loaded into the hopper, the tea may be dispensed into a desired location, such as into a waiting cup, tea pot, or infuser below.

Once the tea is dispensed, a dual tank hot water system including multiple pumps, water level gauges, flow meters and temperature sensors operates to calculate and dispense the proper volume of water having the proper temperature.

In addition, the hot water is recirculated through the outlet tubes and back into the storage tanks to ensure that the water dispensed is as close to the desired temperature as possible.

DESCRIPTION OF THE ILLUSTRATED EMBODIMENTS

For the purposes of promoting an understanding of the principles of the disclosure, reference will now be made to the embodiments illustrated in the drawings and specific language will be used to describe the same. It will nevertheless be understood that no limitation of the scope of the claims is thereby intended, such alterations and further modifications in the illustrated device, and such further applications of the principles of the disclosure as illustrated therein, being contemplated as would normally occur to one skilled in the art to which the disclosure relates.

Certain embodiments of a container and dispenser for use in dispensing loose materials, such as dry products along with a measured amount of water at an elevated temperature will be described herein. Suitable dry products for use with the novel dispenser disclosed herein include tea, coffee, hot cocoa or other beverage powders and the like. For purposes of illustration, the container and dispenser described herein shall be described with respect to the dispensing of loose leaf tea. However, it shall be appreciated that the container and dispenser could be easily applied to other loose materials, such as, but not limited to, those listed above. In one further form, the dispenser may include a coin/bill acceptor and/or credit card terminal or like device for use as a vending machine. In another form, electronic payments such as mobile payments, room keys or fobs for making a room charge, or other types of commonly used and/or know payment methods may be provided for.

Certain embodiments of a tea dispenser and a plurality of tea containers are illustrated in FIGS. 1-8. Depending upon the form desired, the tea containers may be disposable or refillable, any may hold a wide range of tea quantity depending upon design, such as 2-5 lbs. However, it shall be appreciated that the tea containers size may be adjusted so that more or less tea may be stored therein without departing from the scope of the invention. Tea dispenser 20 is illustrated in a stand alone form having an upper portion 22 for storing and selecting one or more tea varieties, a middle portion 24 for dispensing and measuring the selected tea, a bottom portion 26 providing a location for the user to place a receptacle, such as a cup, kettle, tea pot, infuser or the like for receiving the dispensed tea and/or hot water, and a rear portion 28 for storing and dispensing hot water so that it may be dispensed at a desired temperature and in a desired volume. In addition, in the illustrated form tea dispenser includes an electronic controller 30 which includes a user interface 32 and controls the operation of the remaining portions of tea dispenser 20. It shall be appreciated that tea dispenser 20 may take various other forms and configurations depending upon user needs and requirements, including a dispenser which only dispenses water at a selected volume and temperature, or a dispenser which dispenses water at a selected temperature and some other loose material.

As shown in FIGS. 1-8, the tea dispenser 20, and in particular rear portion 28, provides an apparatus, system, and method for dispensing hot water on-demand across a wide range of precisely controlled temperatures and/or volumes. Rear portion 28 includes a first hot water tank 100, which maintains water at a first temperature, and a second hot water tank 200, which maintains water at a second temperature which is higher than the first temperature. In one form, the first hot water tank 100 is larger in volume than the second hot water tank 200. In other forms, the second hot water tank 200 may be larger in volume than the first hot water tank 100 or the two may be of equal size.

It has been found that the vast majority of teas are to be steeped at a temperature between 160° F. and 212° F. Accordingly, for purpose of non-limiting example, when the tea dispenser 20 is utilized for tea, the water in the first hot water tank 100 is maintained at or slightly above/below 160° F. (but preferably at least 90° F.), while the water in the second hot water tank 200 is maintained at or slightly below 212° F. (i.e. within 10° F.). It is desirable to maintain the water in the second hot water tank below the boiling point of water, which is 212° F. (depending upon altitude), to prevent pressure build up and/or increase water loss through steam. By mixing water from the first and second hot water tanks (100 and 200 respectively) in differing ratios, hot water at any temperature between 160° F. and 212° F. can be quickly and accurately dispensed by dispenser 20 at a desired temperature and in a desired volume.

Middle portion 24 of dispenser 20 also includes an electronic controller 30 which receives inputs regarding temperature and flow from a number of sensors which will be described herein and controllably operates other components of dispenser 20 in order to dispense water at the desired temperature and volume. Each of the first hot water tank 100 and the second hot water tank 200 includes a water supply inlet 102/202 through which additional water is fed in order to fill and/or replenish the tanks. Each water supply inlet 102/202 is in fluid communication with a controlled supply valve 104/204. Each controlled supply valve 104/204 is connected to and fed by water supply line 34. In one form, water supply line 34 is in fluid communication with a water supply input 36 located on the rear of the external housing of dispenser 20. In one manner of use, the water supply input 36 is connected to a convention pressurized water supply line. Water supply line 34 may include an inline water filter or other water filtration mechanism (not shown). In other embodiments, the dispenser 20 may be configured for use with an internal or external water tank or some other suitable water source. In some forms, a pump (not shown) may also be provided for use with water supply line 34 when no water pressure is available, when additional water pressure is required or to provide a more controlled water flow rate. In one form, the pump is a variable speed pump which enables rapid replenishment of the tank yet slower flow rates when desired to ensure accurate volumes. In an alternate form, first hot water tank 100 may receive water from the second hot water tank 200 or vice versa.

Each of the first hot water tank 100 and the second hot water tank 200 also includes a heating element 106/206. In the illustrated embodiment, the first and second heating elements 106 and 206 respectively are heating coils, such as an electrical resistive heating element. However, other known heating elements may be utilized, including an induction heater, a combustible gas burner, and a radiant heating unit, to name a few examples. In one form, the heating element 206 is larger than the heating element 106 to enable the second hot water tank 200 to achieve the higher desired temperature than that of hot water tank 100.

Also located within each of the first hot water tank 100 and the second hot water tank 200 are temperature sensors 108 and 208. In the illustrated embodiment, temperature sensors 108 and 208 are located near the top of hot water tanks 100 and 200 so as to provide the most accurate reading of the water which will be dispensed first. Temperature sensors 108 and 208 provide electrical signals to electronic controller 30 which utilizes those signals to control the operation of heating elements 106 and 206 in order to precisely maintain the desired temperature within each of the first hot water tank 100 and the second hot water tank 200. In the illustrated form, temperature sensors 108 and 208 are thermistors.

The first hot water tank 100 and the second hot water tank 200 also include a water level sensor 110/210. The water level sensor may be a magnetic float, or any other type of water level sensor which may be utilized to indicate when the water level within a given tank is at its desired level. Water level sensors 110 and 210 provide electrical signals to electronic controller 30 which utilizes those signals to control the operation of controlled supply valves 104 and 204 in order to maintain the desired volume of water within each of the first hot water tank 100 and the second hot water tank 200. In operation, the water may only be replenished after a hot water dispensation cycle is complete in order to maintain the desired water temperature within each of first hot water tank 100 and the second hot water tank 200 throughout the cycle. While possible, introducing colder water from water supply line during a dispensation cycle would lower the temperate of the water within the first hot water tank 100 and the second hot water tank 200 and thus require adjustments to be made to the ratio of water dispenses from each tank in order to reach the desired dispense temperature.

The first hot water tank 100 and the second hot water tank 200 are connected to first and second hot water outlet tubes 112/212 respectively. The first hot water outlet tube 112 and the second hot water outlet tube 212 are each fed by a first/second water pump 114/214, which supplies water from within the tank through a first/second output valve 116/216 and a first/second flow meter 118/218. First and second water pump 114 and 214, first and second output valves 116 and 216, and first and second flow meters 118 and 218 are each in electrical communication with and/or controllably operated by electronic controller 30. Any suitable pump may be used including by way of example, but not limitation, a gear pump, a centrifugal water pump, a positive displacement water pump or an axial flow pump. In one form, the pump is a variable speed pump which enables rapid dispensing of hot water when desired yet slower more controlled flow rates when desired to complete a dispensation cycle. In addition, any suitable valve may be used including by way of example, but not limitation, a butterfly valve or solenoid valve. Water may be released from either or both of the first hot water tank 100 or the second hot water tank 200 via the respective first or second hot water outlet tube 112/212. The first and second flow meters 118 and 218 measure and report the precise amount of water dispensed from each of the first hot water tank 100 and the second hot water tank 200 into the first and second hot water outlet tubes 112 and 212 respectively.

Hot water is dispensed from the first and second hot water outlet tubes 112 and 212 into a common chamber 38 where the hot water is mixed together through turbulence before being dispensed out of the water dispense port 40 of dispenser 20. In a further form (not shown), dispenser 20 may include another flow meter, a dispense valve and a drain valve which may be used to provide secondary measurement and control of the volume of hot water being dispensed via water dispense port 40. Any excess water in the common chamber 38 could be removed via a drain line using a drain valve.

In the illustrated form, to increase the consistency of the water temperature therein, each of the first hot water tank 100 and the second hot water tank 200 includes a circulation pump 120 and 220, which may be mounted within or adjacent to the tank, in order to circulate the water contained therein to ensure a consistent temperature within the tank as well as to promote faster heating. The circulation pumps 120 and 220 are connected to and controlled by electronic controller 30 and may be operated continuously, intermittently, on a schedule, or at selected times, such as briefly prior to a dispensation cycle. The first hot water tank 100 and the second hot water tank 200 also each include one or more pressure relief valves or openings 121/221 to prevent the potential for any pressure build-up therein.

In use, a user of dispenser 20 selects a desired dispense temperature for the water and a desired dispense volume combination, either directly or via a selection of a type of tea for which an ideal water temperature is pre-programmed and serving size, into the electronic controller 30 by using user interface 32. During normal operation, the first hot water tank 100 and the second hot water tank 200 would already be filled with water that is generally maintained at a consistent and known temperature to make any mixture of the two consistent and predictable. Electronic controller 30 contains logic to perform calculations using the temperatures of the volumes of water in the first and second water tanks 100 and 200 (as determined by temperature sensors 108 and 208) to calculate the precise volume of water that needs to be dispensed from each of the first and second hot water tanks to deliver the desired volume of hot water at the desired temperature.

Once the volume of water needed from each of the first hot water tank 100 and the second hot water tank 200 are determined by electronic controller 30, electronic controller 30 may initially controllably operate first and second water pumps 114 and 214 as well as the first and second output valves 116 and 216 to dispense the appropriate volumes from the first and second hot water tanks 100/200. Any suitable method of measuring a dispensed volume may be utilized, however, in the illustrated embodiment each of the first and second hot water outlet tubes 112/212 includes a flow meter 118/218 therein which accurately determines the volume of water dispensed from each of the first hot water tank 100 or the second hot water tank 200. The water output from each of the hot water outlet tubes 112 and 212 mixes together to form one mixed volume in the common chamber 38 before being dispensed out of water discharge line 40 and into the receptacle which is positioned within the bottom portion 26 of dispenser 20. The complete volume of hot water output by dispenser 20 does not combine into a chamber of the dispenser 20 prior to being dispensed, thereby decreasing the size of the machine.

In order to detect temperature variation caused by heat loss as the hot water travels down hot water outlet tubes 112 and 212, dispenser 20 may also include secondary temperature sensors 122 and 222 are located so as to determine the temperature of the water in the hot water outlet tubes 112 and 212. In this form, dispenser 20 also includes pipe heating elements 124 and 224 which are located in close proximity to hot water outlet tubes 112 and 212 respectively. Secondary temperature sensors 122 and 222 provide electrical signals to electronic controller 30 which utilizes those signals to control the operation of pipe heating elements 124 and 224 in order to provide a small temperature boost to the hot water exiting one or more of the hot water outlet tubes 112/222. Alternatively or additionally, the pipe heating elements 124 and 224 may be activated prior to a dispensing cycle in order to pre-heat the hot water outlet tubes 112/212 in order to minimize heat loss from the water being dispensed. In certain circumstances, the temperatures sensed by secondary temperature sensors 122 and 222 may cause the electronic controller 30 to modify the ratio of water being dispensed on the fly during a dispense cycle in order to more precisely achieve the desired temperature.

At the conclusion of each dispense cycle, the dispenser 20 purges any water remaining within first and second hot water outlet tubes 112 and 212. This purge ensures that no water from the prior dispensation cycle, which may have cooled significantly depending upon the time gone by, is dispensed as part of the next cycle thereby reducing the actual temperature of the hot water dispensed below the desired temperature. This may be accomplished through the use of a drain valve on each of hot water outlet tubes 112/212 which connects to a drain line or the water may be recycled into one of the first or second water tank 100/200.

Given the desire to maintain hot water at a temperature just below boiling, the dispenser 20 may include an altimeter or barometer 42 which accurately reads the elevator of the dispenser 20 or the barometric pressure. In an alternate form, a global positioning system (GPS) device may be utilized. Any of these devices can be used to determine the actual boiling point of water which will be experienced at the location of dispenser 20. In one form, altimeter or barometer 42 provides this environmental information upon start up of the dispenser 20 or more periodically to electronic controller 30 which may raise or lower the temperature in one or more of its hot water tanks accordingly. This dynamic adjustment enables the dispenser 20 to operate one or more of the first and second hot water tanks 100 and 200 at a higher temperature when near sea level than it otherwise might be programmed do. Additionally, this adjustment also ensures that no complications will develop when and if the dispenser 20 is operated at high altitudes.

In the form illustrated, upper portion 22 of tea dispenser 20 includes a plurality of interchangeable tea containers 44, with each tea container 44 being connected to a removable dispensing mechanism 46. Upper portion 22 also includes a receiving portion 48 in the form of a carousel 50 which includes a number of ports 52 into which a tea container 44 and its associated dispensing mechanism 46 may be secured. In one form, when secured to receiving portion 48, each tea container 44 forms an equal portion of a cylindrical shape. In the illustrated form, six tea containers 44 are provided, but it shall be appreciated that two, four, eight, ten, twelve or any other desired number of tea containers may be provided for.

In the embodiment illustrated, each tea container 44 includes a hollow recess suitable for the storage of tea for subsequent dispensing. In one form, each tea container 44 is manufactured from a blow molded plastic, but other forms may be utilized without departing from the scope of the invention. Each tea container 44 also includes a removable dispensing mechanism 46. In the illustrated embodiment, tea container 44 also comprises a standard lid which form a seal with respect to the tea container 44, and in a further form a hermetic seal, to prevent the contents of tea container 44 from coming into contact with the outside environment, thereby maintaining its freshness prior to dispensing. The lid may be a screw on or snap fit lid and/or a foil or other thin film seal. Dispensing mechanism 46 mounts to the base of tea container 44 and serves to controllably release the contents of container 44, using the force of gravity, when properly positioned within dispenser 20 and actuated by electronic controller 30.

Each dispensing mechanism 46 includes a connector 54, an agitator 56, a dispensing chute 58 and a drive screw 60. Connector 54 may be a screw or snap fit connection with is configured to connect to and create a tight seal with the opening of a tea container 44. When connected to a tea container 44, agitator 56 of dispensing mechanism 46 extends upwards into the interior of tea container 44 and enables selective and/or intermittent operation during dispensing by electronic controller 30. Dispensing chute 58 includes a proximal end which connects to the interior of tea container 44 and a distal opening. Between proximal end and dispenser opening, a rotably mounted drive screw or helical coil 60 is disposed within dispenser chute 58 along at least a portion of its length. Screw/Coil 60 may be formed of one or more pieces of wire or other suitable material or alternatively may be formed as a solid helical screw made of metal, plastic, or the like so as to have more fully defined vanes, which may be more beneficial when dispensing a finer powered material as opposed to a larger loose material. In a preferred form, the diameter of dispenser chute 58 is between approximately ½" and 2" and the diameter of screw/coil 60 is between ⅜" and ½" with a pitch of between ¼" and ⅜". In a further preferred form, the diameter of dispenser chute 58 is approximately 1", and the diameter of wire which forms screw/coil 60 is between 1/32" and 1/16". Screw/coil 60, much like agitator 56, may be selectively engaged and driven by electronic controller 30.

Dispensing mechanism 46 may also include a seal 62 which is forced open by a cam 64, linear actuator or other suitable mechanism only during operation in order to maintain the airtight seal of container 44, thereby protecting its contents. As shown, seal 62 may be a hinged door or flap which closes against distal opening to establish a seal. In one form, seal 62 is held closed by a magnet 66 which is mounted to the seal 62 and biases the seal 62 against the distal opening.

Carousel 50 of receiving portion 48 is selectively driven by a motor 68 controlled by electronic controller 30 and a drive belt 70 so as to position the desired tea container 44 over the feed chute 72. Feed chute 72 leads tea from the distal opening of a given dispensing mechanism 46 to measuring portion 74. Carousel 50 includes a mechanical or optical feedback sensor 76 which accurately determines the angular rotation of carousel 50 to ensure that electronic controller 30 may position it (and the tea containers 44 mounted therein) quickly in the desired position.

Measuring portion 74 includes a hopper 78 for receiving tea dispensed from feed chute 72 of tea container 44 under the control of electronic controller 30. Feed chute 72, according to this form, is a fixed cylindrical chute whose proximal end is aligned with the distal opening of dispensing mechanism 46 of the tea dispenser 20 that is located in the appropriate positon of carousel 50. When tea or some other material is present within container 44, it is fed into dispenser chute 58 at its proximal end. When drive screw/coil 60 is activated, by electronic controller 30, it begins turning in a direction which forces the material present at proximal end toward distal opening. Once the material reaches distal opening it is forced out of the dispenser chute 58, through the feed chute 72 and into hopper 78. Hopper 78 is mounted to one end of arm 80 which is then pivotally mounted to an internal frame of the housing of tea dispenser 20 at its opposite end. Arm 80 also includes an integrated strain gauge 82 which is suitable for electronically measuring the mass of the material dispensed by dispensing mechanism 46, through chute 58 and feed chute 72, and ultimately into hopper 78 on a near-real time basis and reporting its measurements to electronic controller 30. As such, when electronic controller 30 determines that a pre-determined amount of material has been dispensed into hopper 78, the operation of screw/coil 60 is de-activated. In a further form, drive screw/coil 60 is operated by electronic controller 30 at a variable speed, such that when the amount of material still needed to be dispensed remains high, screw/coil 60 operates at a higher speed, but when the amount of material in hopper 78 approaches the desired amount, the speed of screw/coil 60 may be gradually or discretely reduced so as to provide as close as possible to be desired amount of the dispensed material into hopper 78. Once the desired amount of tea has been dispensed into hopper 78, arm 80 is released and the contents of the hopper 78 are dumped into funnel 84, which guides the contents of hopper 78 out of the middle portion 24 and down into the designated area when a waiting container is positioned in the bottom portion 26. It shall be appreciated that when a bulk tea dispensation is required, one or more cycles of dispensing and dumping of hopper 78 may be required in order to achieve a large desired volume.

In the event a different type of tea is desired by a user, following user input so specifying, electronic controller 30 causes carousel 50 to be rotated by motor 68 and belt 70 so as to rotate the tea container 44 which contains the selected tea into the appropriate position above feed chute 72, as determined by sensor 76, and begins the dispensation cycle by activation that tea container 44's dispensing mechanism 46. In order to provide the type of tea contained within each of tea containers, such as tea container 44, the dispenser 20 may include an optical scanner 86 or the like which is capable of reading a properly positioned label, barcode, QR code 88 or the like on each tea container 44. Information encoded therein or associated with the code may be the type of tea, the temperature of water that is ideal for that tea, the proper tea to water ratio, serving size information, and the total amount of tea initially contained in the canister. In another form, some or all of this information may be input into electronic controller 30 by the user. This information may then be utilized by the electronic controller 30 to present the user interface 32 to the user and dispense the proper amount of tea and hot water when called upon.

In one form, bottom portion 26 includes a plurality of legs 90 which support dispenser on a counter, table or the like. In some cases 1, 2, 3 or more of legs 90 which support tea dispenser 20 may be linearly actuable by electronic controller 30 so as to enable dispenser 20 to self-level itself to ensure proper operation. Bottom portion 26 may also include an infusion bag dispenser 92 so as to enable a user to quickly and easily retrieve an infusion bag for dispensing the loose tea into for steeping. The infusion bag dispenser may hold a convenient quantity of infusion bags/tea bags or the like and may be easily refillable.

It shall be appreciated that many user interface designs may be utilized without departing from the scope of the present disclosure. A touch screen user interface 32 in which a number of user selectable options are provided for various sized beverages is provided. For example, user interface 32 may include logical buttons which correspond to an 8 oz., 16 oz, and 20 oz. beverage respectively. Additionally, one or more of these buttons may be programmed to provide a customized size, such as 12, 18, or 20 ozs. In a further form, the size associated with these buttons may be customized by the user so as to correspond to the sizes of tea which the user prefers or which are available on the menu, such as in the case of a restaurant or tea shop. Additionally, when the user interface is provided in a touch screen, the buttons may be changed so as to show to currently programmed size, such as in ounces (or the metric equivalent), the currently programmed volume of water, and the current temperature of water to be dispensed with the selected tea, or the like. Furthermore, if desired, one or more buttons may be customized to provide for a larger volume, such as that of a tea pot, or a bulk tea bag or container (where no water is needed).

Upon selection of button, electronic controller 30 (shown in FIG. 1) is configured to operate tea dispenser 20 to dispense a measured amount of tea suitable for providing an 8 oz. tea beverage, as well as 8 oz. of hot water at a temperature matching the ideal temperature for steeping the selected tea. Given that the amount of tea required to make a certain volume of tea is fairly standard for all types of tea (such as 2.5 g of loose leaf tea per 6 oz. of water), the user interface may remain relatively simple, if desired. Alternatively, in the case of teas which include other ingredients, such as chai tea, the weights corresponding to the various buttons may be increased accordingly depending upon the type of tea the carousel 50 is currently configured for. For example, in one form user interface 32 may accept input regarding one of a number of predefined types of teas and a desired volume of tea. Based upon the currently selected tea, the amount of tea dispensed (such as by weight) for the selected volume may be different than it would have been had a different tea type been selected. In a further form, this information may be provided to or linked to within electronic controlled 30 by scanner 86 and code 88 on the selected container 44.

Figure 1:
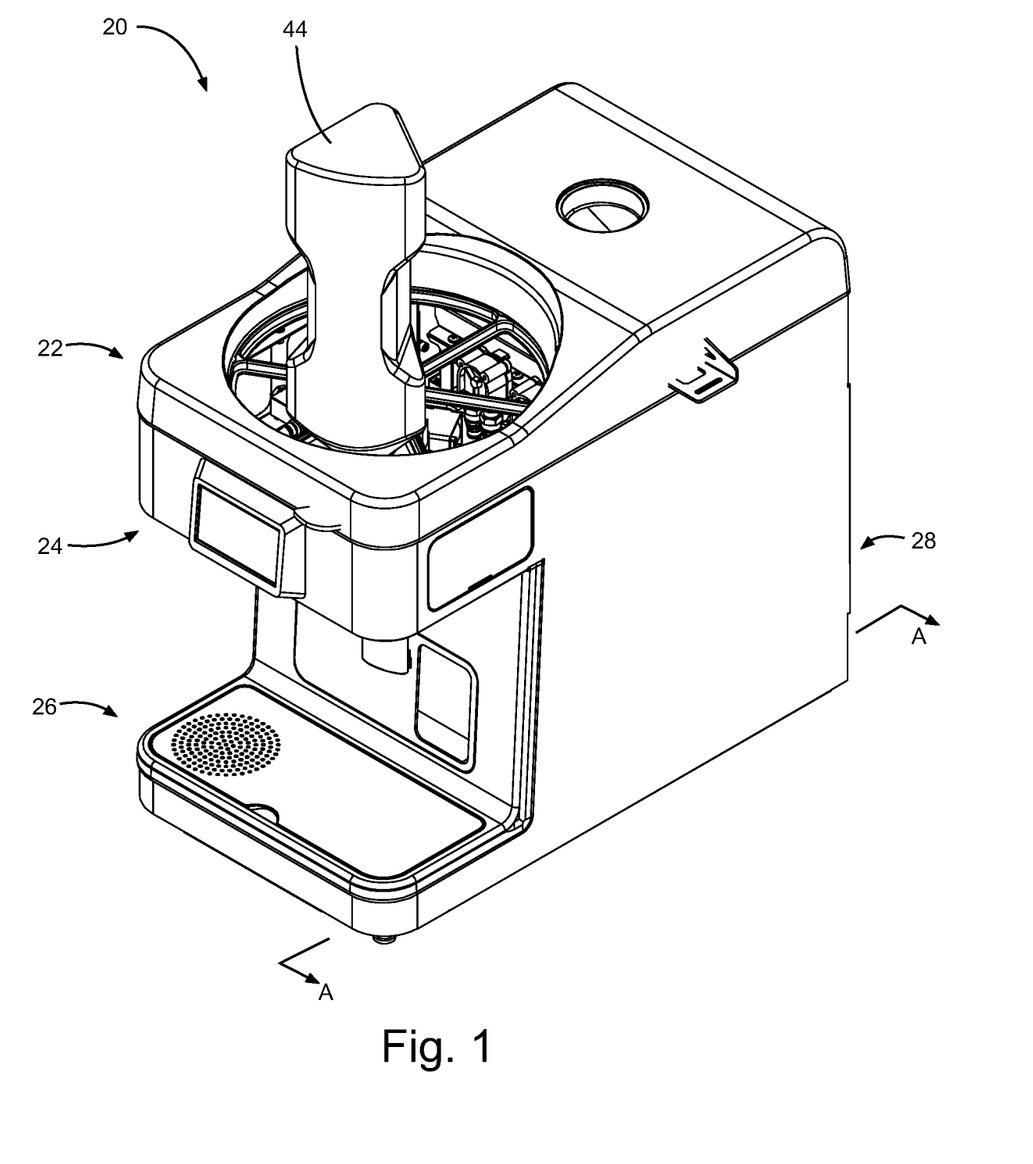
FIG. 1 is a perspective view of a tea and water dispenser according to one embodiment of the present invention.
Figure 2:
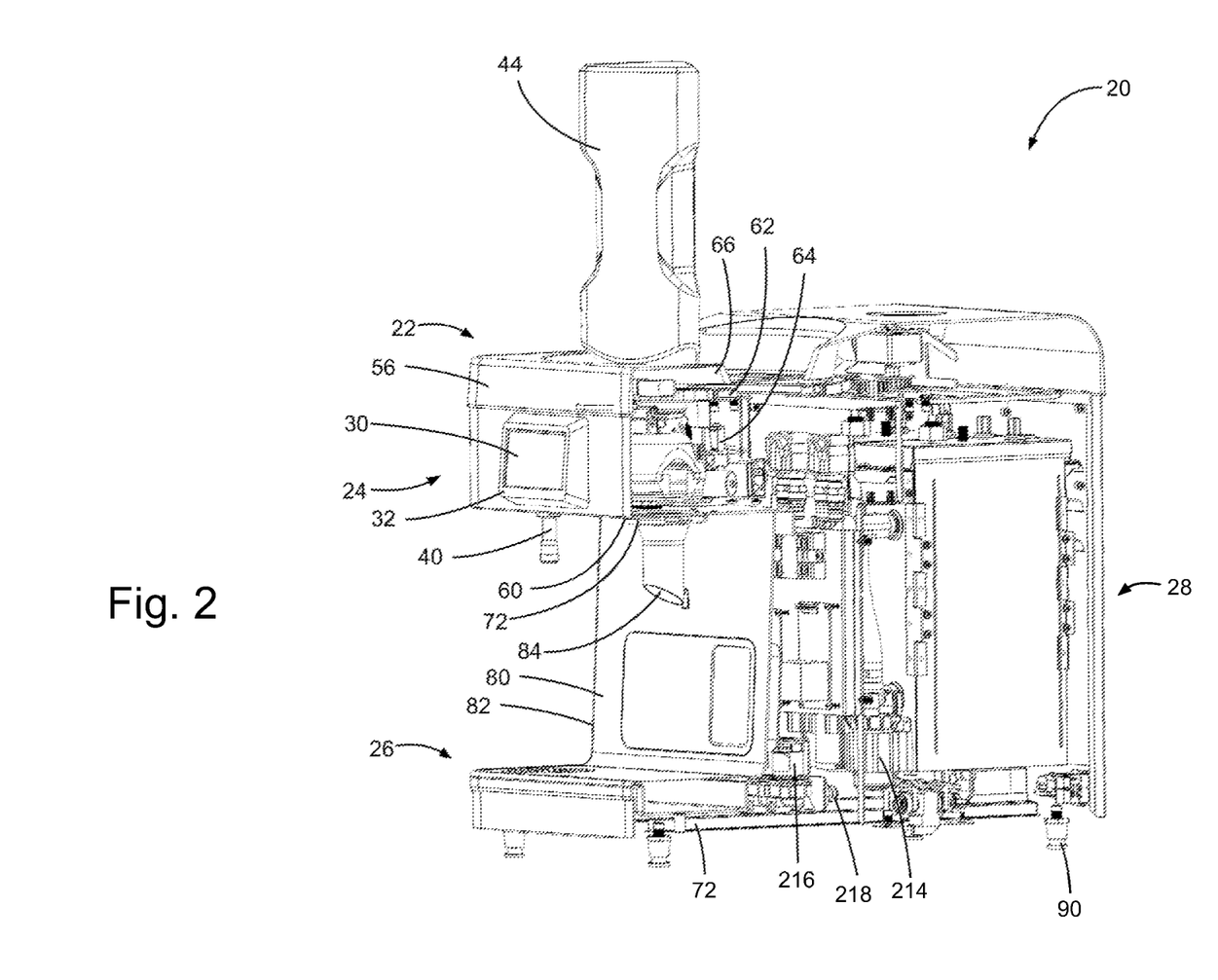
FIG. 2 is a cut-away perspective view of a tea and water dispenser along the line A-A of FIG. 1.
Figure 3:
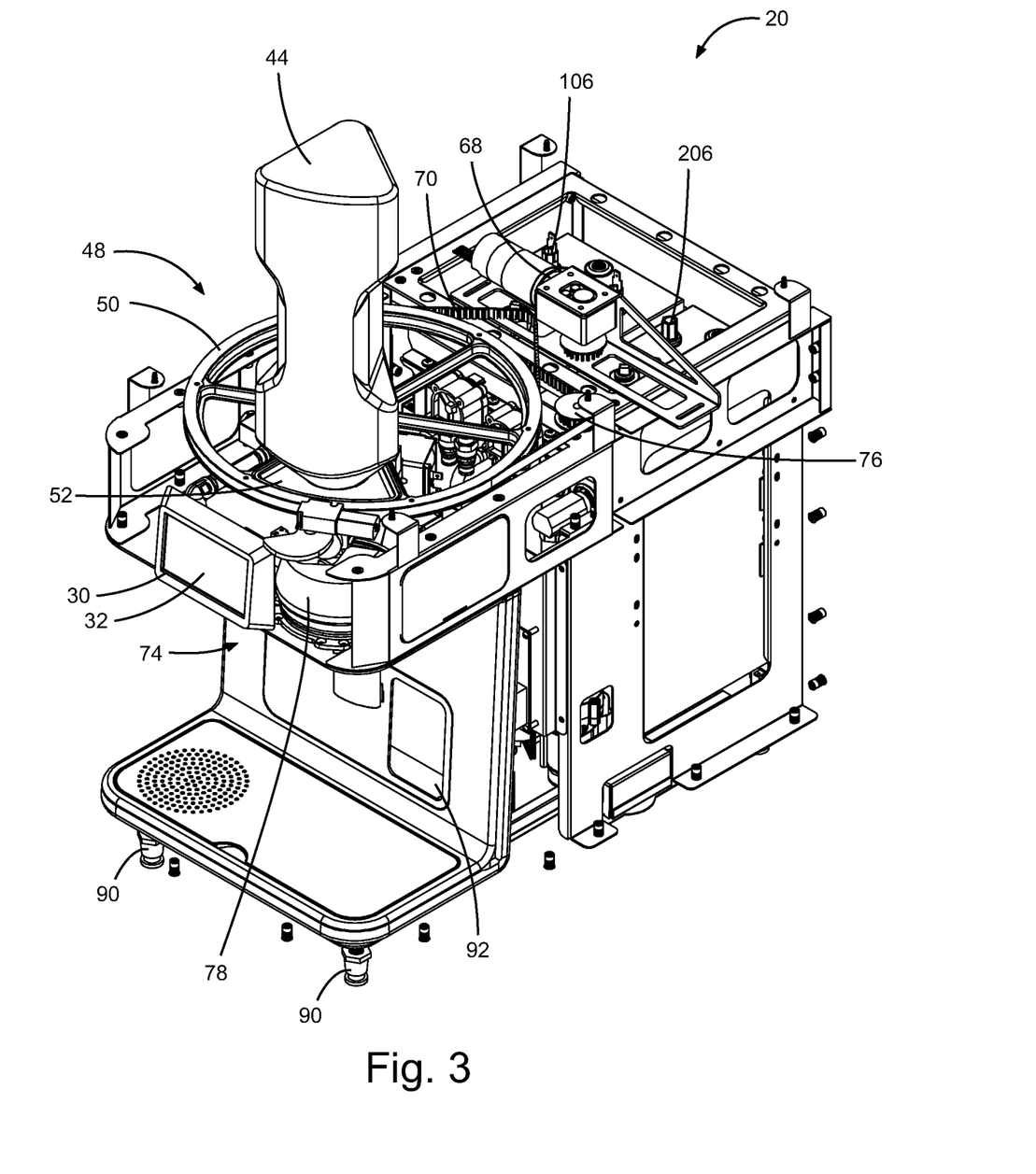
FIG. 3 is a partially exploded view of a portion of a tea and water dispenser according to one embodiment of the present invention.
Figure 4:
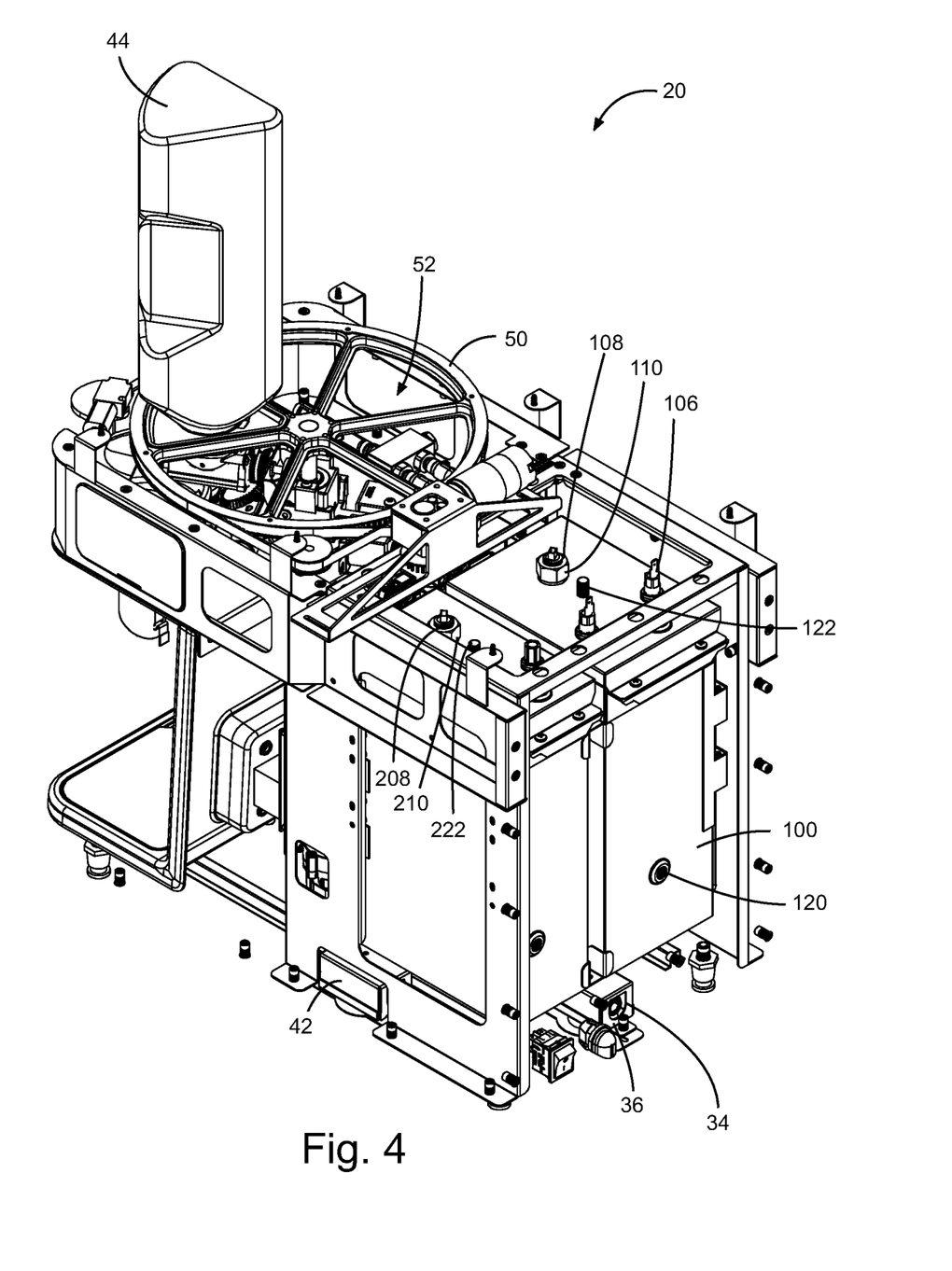
FIG. 4 is another partially exploded view of a portion of a tea and water dispenser according to one embodiment of the present invention.
Figure 5:
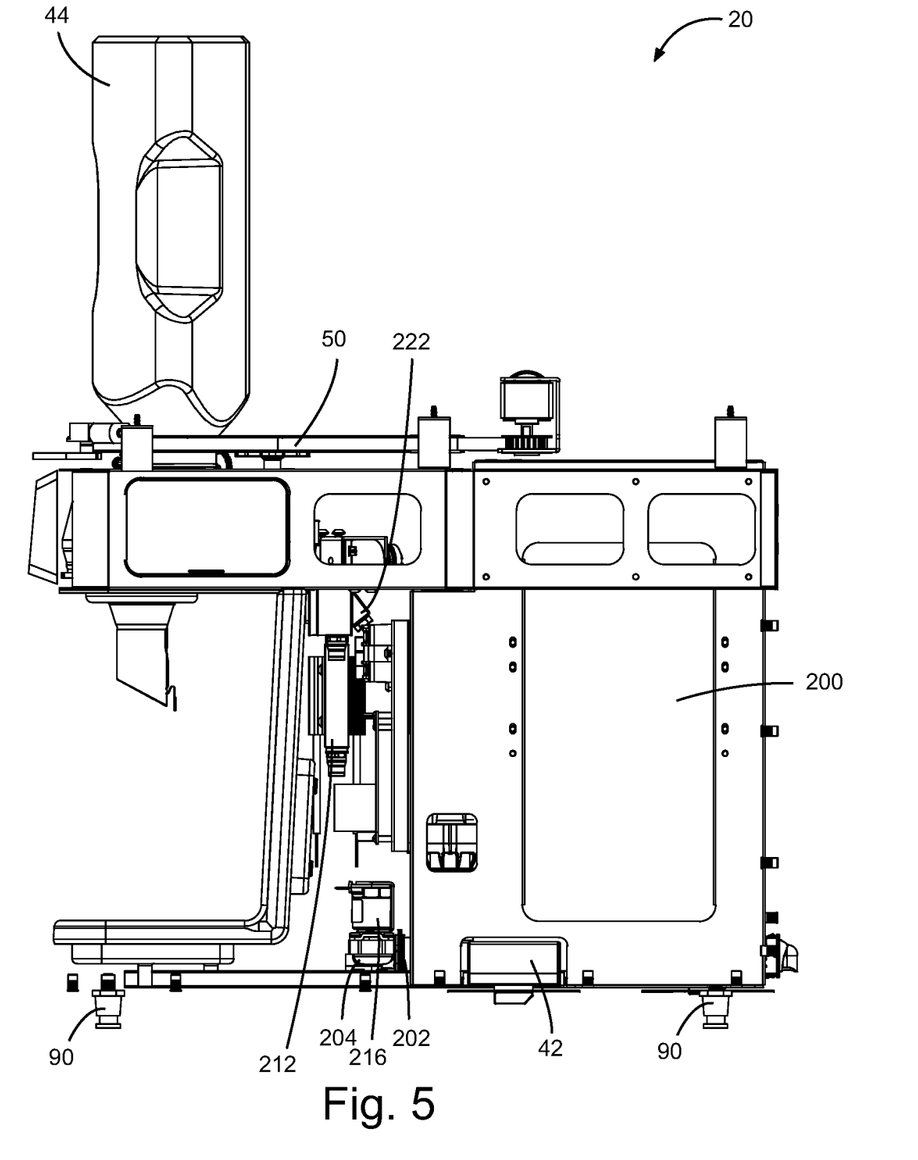
FIG. 5 is side view of a portion of a tea and water dispenser according to one embodiment of the present invention.
Figure 6:
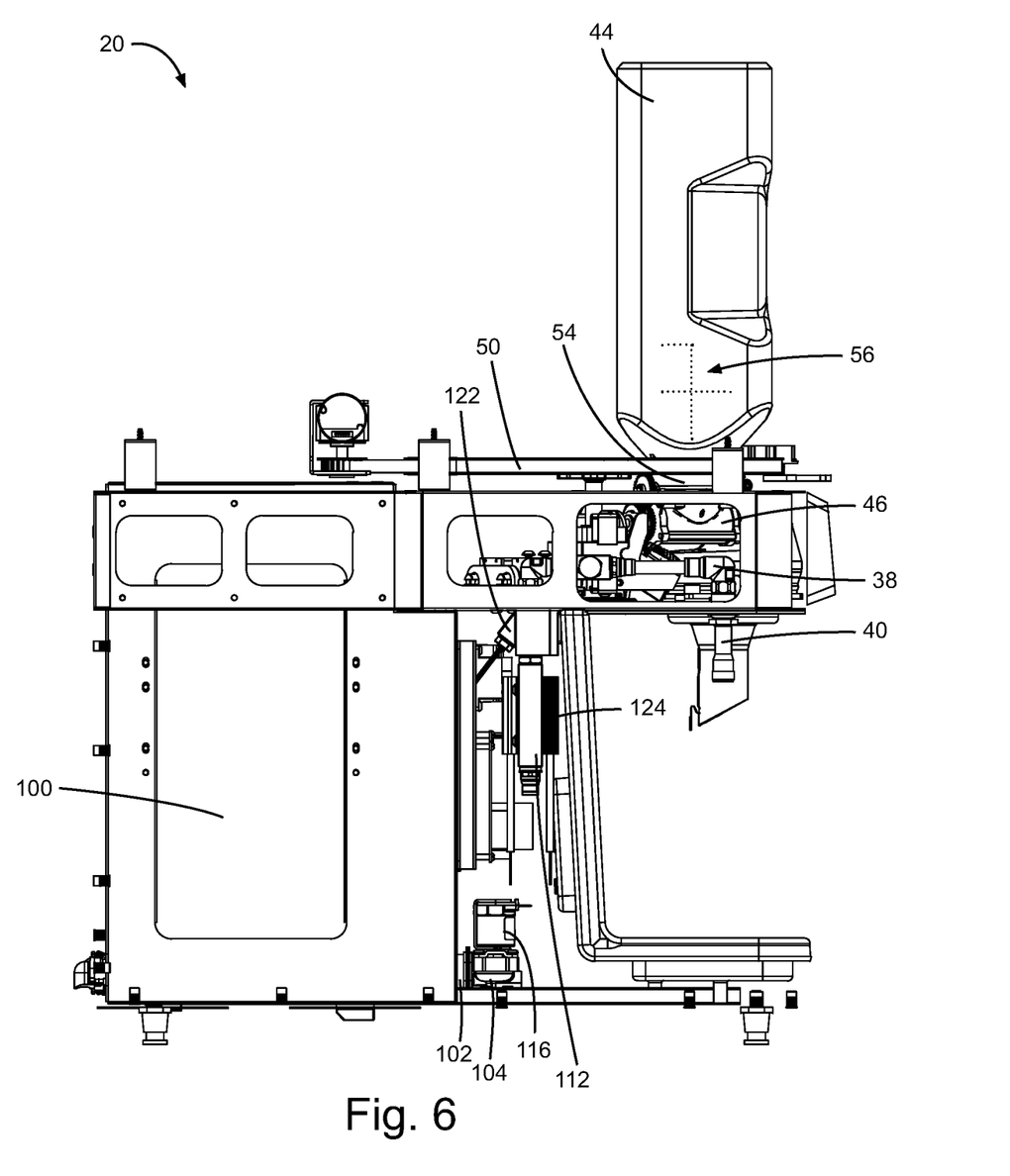
FIG. 6 is another side view of a portion of a tea and water dispenser according to one embodiment of the present invention.
Figure 7:
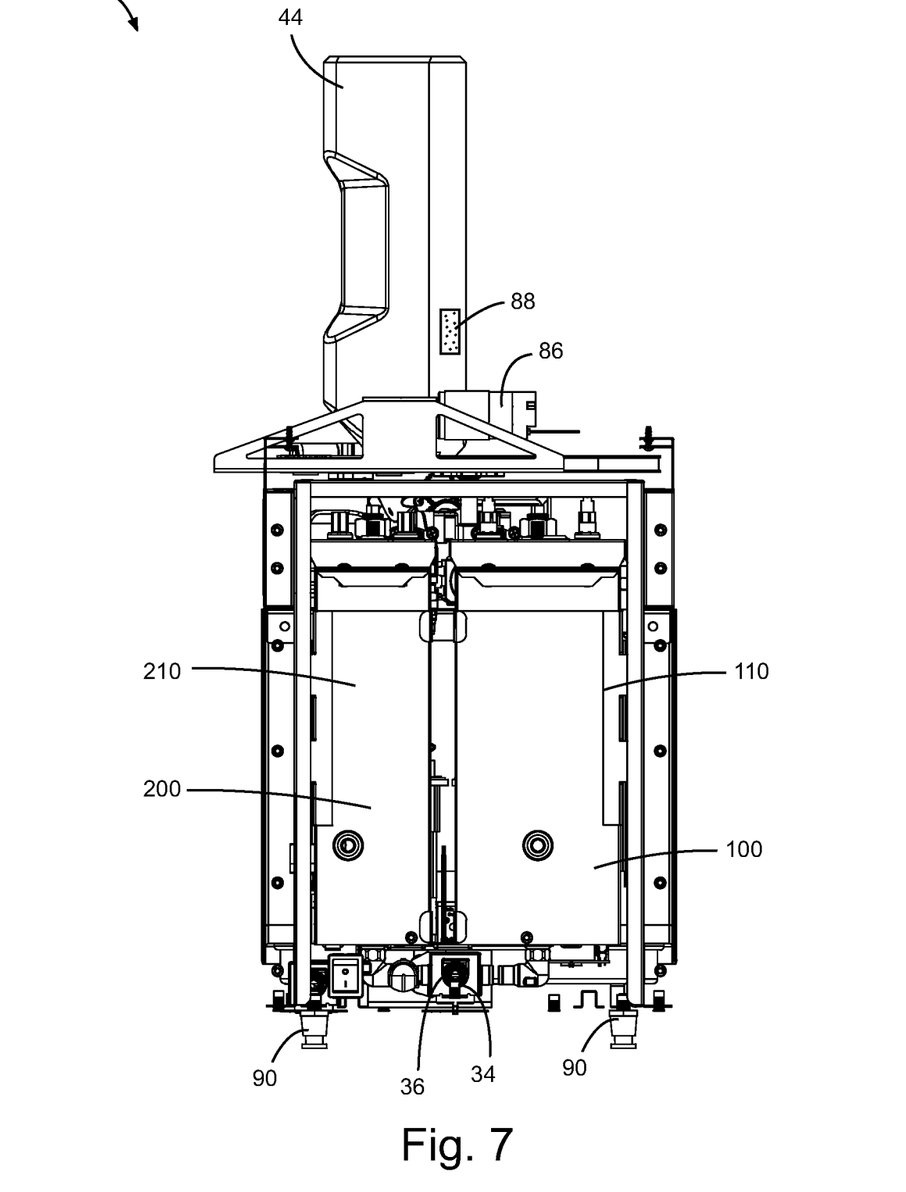
FIG. 7 is rear view of a portion of a tea and water dispenser according to one embodiment of the present invention.
Figure 8:
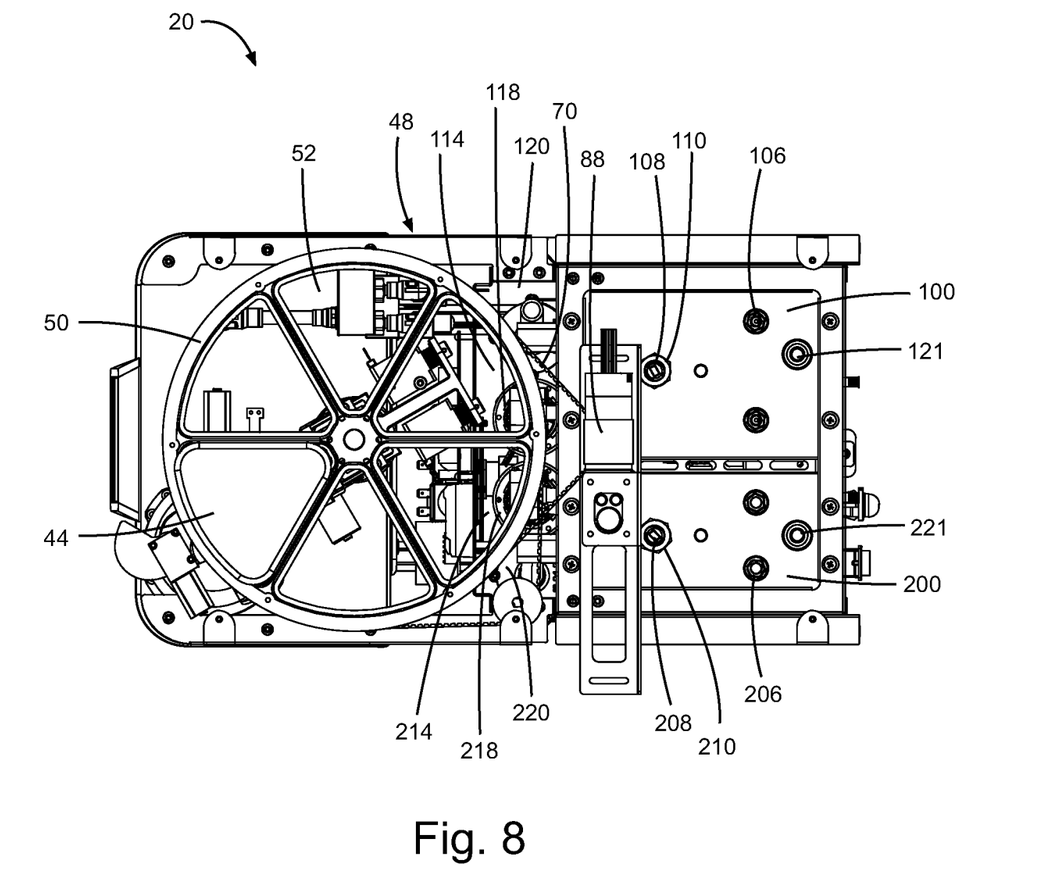
FIG. 8 is top view of a portion of a tea and water dispenser according to one embodiment of the present invention.
Figure 9:
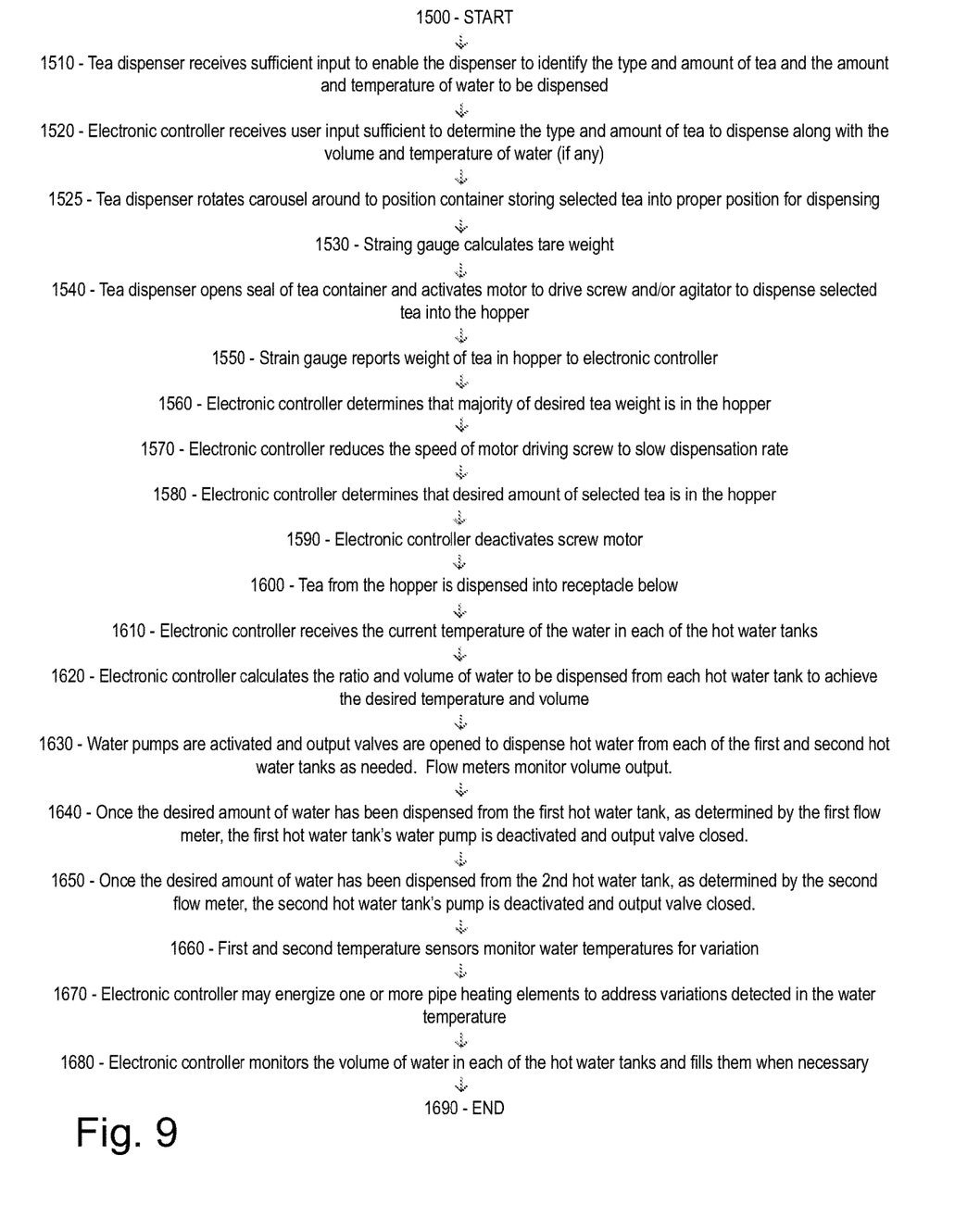
FIG. 9 is a flowchart illustrating a process which controls the operation of the dispenser of any of FIGS. 1-8 in accordance with one form of the present invention.

FIG. 9 illustrates a flowchart which, along with continued reference to FIGS. 1-8, shows a beverage selection and dispensing process in accordance with one form of the present invention, which will be used to illustrate the manner in which tea dispenser of FIG. 1 may operate. Process 1500 begins with step 1510 in which the tea dispenser 20 receiving input sufficient to enable the dispenser to identify the type and amount of tea to be dispensed and the amount and temperature of water to be dispensed. For exemplary purposes, this may include an indication input into a user interface, such as user interface 32, that the user desires an 8 oz. chai tea, or that the user desires a 16 oz. green tea made either slightly stronger or weaker than normal. Of course, the type of tea selected or indicated by the user must be a type of tea currently maintained in a tea container 44 which is installed within carousel 50 of the dispenser 20. In addition, each type of tea is associated with an ideal water temperature for steeping within the electronic controller 30. This information may also be encoded within a QR code one or more containers and downloaded based on information encoded therein. The process proceeds to step 1520 in which the electronic controller 30 of tea dispenser 20 receives the user input and determines the type and amount of tea (in weight) to be dispensed along with the volume and temperature of water (if any) to be dispensed. The electronic controller 30 then begins to dispense the tea by rotating the carousel 50 so that the tea container 44 storing the selected type of tea is in the proper position in step 1525. Next, the dispenser 20 calibrates the value perceived by strain gauge 82 to zero in order to accurately measure the amount of tea added to the hopper 78 in step 1530. The electronic controller 30 then rotates cam 64 so as to open the seal 62 of the presently selected tea container 44 and then the motor(s) which drives agitator 56 and screw 60 in step 1540. Shortly thereafter, tea from container 44 begins to accumulate in hopper 78. As this occurs, strain gauge 82 begins periodically reporting a value indicating the weight of the tea dispensed into hopper 78 to electronic controller 30 in step 1550. If necessary, the screw 60 may be selectively reversed for a brief time before being returned to normal operation, so as to clear any potential jams or clogs. Once the electronic controller 30 determines that the weight of tea dispensed into hopper 78 is approaching a predetermined percentage of the amount to be dispensed (step 1560), electronic controller 30 lowers the speed of the motor which drives screw/coil 60, thereby decreasing the rate of dispensing (step 1570). Once the electronic controller 30 determines that the desired weight of tea has been dispensed into hopper 78 (step 1580), the electronic controller 30 deactivates the motor(s) which drives agitator 56 and screw/coil 60 in step 1590, and releases the mechanism which holds arm 80, thereby dumping the contents of hopper 78 down and into funnel 84 and ultimately into the user's waiting container (step 1600). In one form, the electronic controller 30 may reverse the direction of operation of the motor to turn the drive screw 60 briefly in the reverse direction so as to clear the end of chute 58 to provide for a clean contact surface for seal 62. It shall be appreciated that when a bulk tea dispensation is required, one or more cycles of steps 1540-1590 may be required in order to achieve a large desired volume. In a further form, a sensor is required to sense a receptacle, such as a cup or the like, in the dispensing area prior to the tea dispenser 20 being operable to dispense the tea in step 1600. It shall be appreciated that in some forms agitator 56 may only be operated intermittently during a dispense cycle and not continuously.

Now that the tea dispensation cycle is complete, the next step begins the hot water dispensation cycle. As shall be appreciated, in the arrangement of dispenser where only hot water is to be dispenses, the process may omit some or all of the preceding steps. This cycle beings at step 1610 with the electronic controller 30 receiving the current temperature of hot water tank 100 (as reported by temperature sensor 108) and the temperature of hot water tank 200 (as reported by temperature sensor 208) to determine the volume of water to be dispensed from each of the first hot water tank 100 and the second hot water tank 200. In one form, the electronic controller may also energize pipe heating elements 124 and 224 to bring the first hot water outlet tube 112 and the second hot water outlet tube 212 up to an elevated temperature so as to minimize any radiant heat loss from the water. In one form, the circulation pumps 120 and 220 may be operated continuously so that this temperature reading may be taken right away. However, in other forms, the circulation pumps 120 and 220 may be run only periodically, in which case the electronic controller 30 would activate the circulation pumps 120 and 220 for a brief time before reading the water temperatures. In the next step, step 1620, the electronic controller 30 utilizes the volume of hot water desired, the temperature of water desired, and the temperatures received in step 1510 to determine the amount of water that needs to be dispensed from each of the first hot water tank 100 and the second hot water tank 200 in order to properly dispense the predetermined volume of water at the selected temperature. For example, it may be determined by electronic controller 30 that ounces of water needs to be dispensed from second hot water tank 200 and that two ounces of water from first hot water tank 100 needs to be dispensed in order to ultimately dispense 12 ounces of water at 180° F. Once these volumes are determined, in step 1630, electronic controller 30 activates first water pump 114 and opens first output valve 116 to begin dispensing hot water from the first hot water tank 100. Simultaneously, or in an interleaved fashion, electronic controller 30 activates second water pump 214 and opens second output valve 216 to begin dispensing hot water from the second hot water tank 200. In one form, the speed of the first and second water pumps 114 and 214 are adjusted so that the time to dispense the desired volume remains relatively constant, thereby providing a near uniform hot water profile across the dispense cycle and preventing hotter or colder water than desired from being dispensed at any given time. During the dispensing of step 1630, electronic controller 30 monitors the amount of hot water dispensed from each of the first and second hot water tanks 100 and 200 using readings received from flow meters 118 and 218. Once the desired volume of hot water is dispensed from the first hot water tank 100, the electronic controller 30 turns off the first water pump 114 and closes the first output valve 116 (step 1640). In addition, once the desired volume of hot water is dispensed from the second hot water tank 200, the electronic controller 30 turns off the second water pump 214 and closes the second output valve 216 (step 1650). In one further form, for safety, the user must press (or press and hold) a button on the user interface of dispenser 20 in order to permit the actual dispensation of hot water to proceed. The electronic controller may be preprogrammed to adjust for the amount of water than may be used in priming the line before dispensing to the desired receptacle via output tube, as ultimately this water is drained after each cycle. Throughout this process, electronic controller 30 receives temperature readings from secondary temperature sensors 122 and 222 to detect any variation in the water temperature being dispensed from the first and/or second hot water tanks 100 and 200 (step 1660). In the event of a lower than expected temperature, the electronic controller may energize one or more of pipe heating elements 124 and 224 to increase the temperate of the water a small amount prior to dispensation (step 1670). Following this, the electronic controller 30 measures the amount of water present in each of the first and second hot water tanks 100 and 200 using water level sensors 110 and 210 and may controlled water supply valves 104 and/or 204 to replenish the water therein (step 1680) The process ends at step 1690.

In a further form, the electronic controller 30 continuously monitors the temperatures reported by secondary temperature sensors 112 and 222 and makes adjustments to the volumes of water from first hot water tank 100 and second water tank 200 which are to be dispensed to adjust for slight variations from the parameters of the initial calculation made during step 1620.

The tea dispenser 20 is capable of operation whereby only a measured amount of tea or only a specified volume of water at a specified temperature is provided. One of skill in the art shall immediately appreciate the steps which would be omitted from the process of FIG. 9 in order to accomplish these two operations.

It shall be appreciated by one of skill in the art that many of the steps may occur simultaneously or in various order, with varying time intervals between steps also being possible. In a further form, the electronic controller 30 may perform more than one speed adjustment in order to quickly dispense tea and/or hot water up to a certain percentage of the desired amount and then go through several speed reductions in order to accurately and quickly arrive at the desired weight.

It shall also be appreciated that the above method may be adapted for use with dispenser 21 disclosed below. For example, recirculation loops may be utilized in place of the recirculation pumps and the direction control valves are utilized to select between dispense and recirculate mode at the appropriate times.

Figure 10:
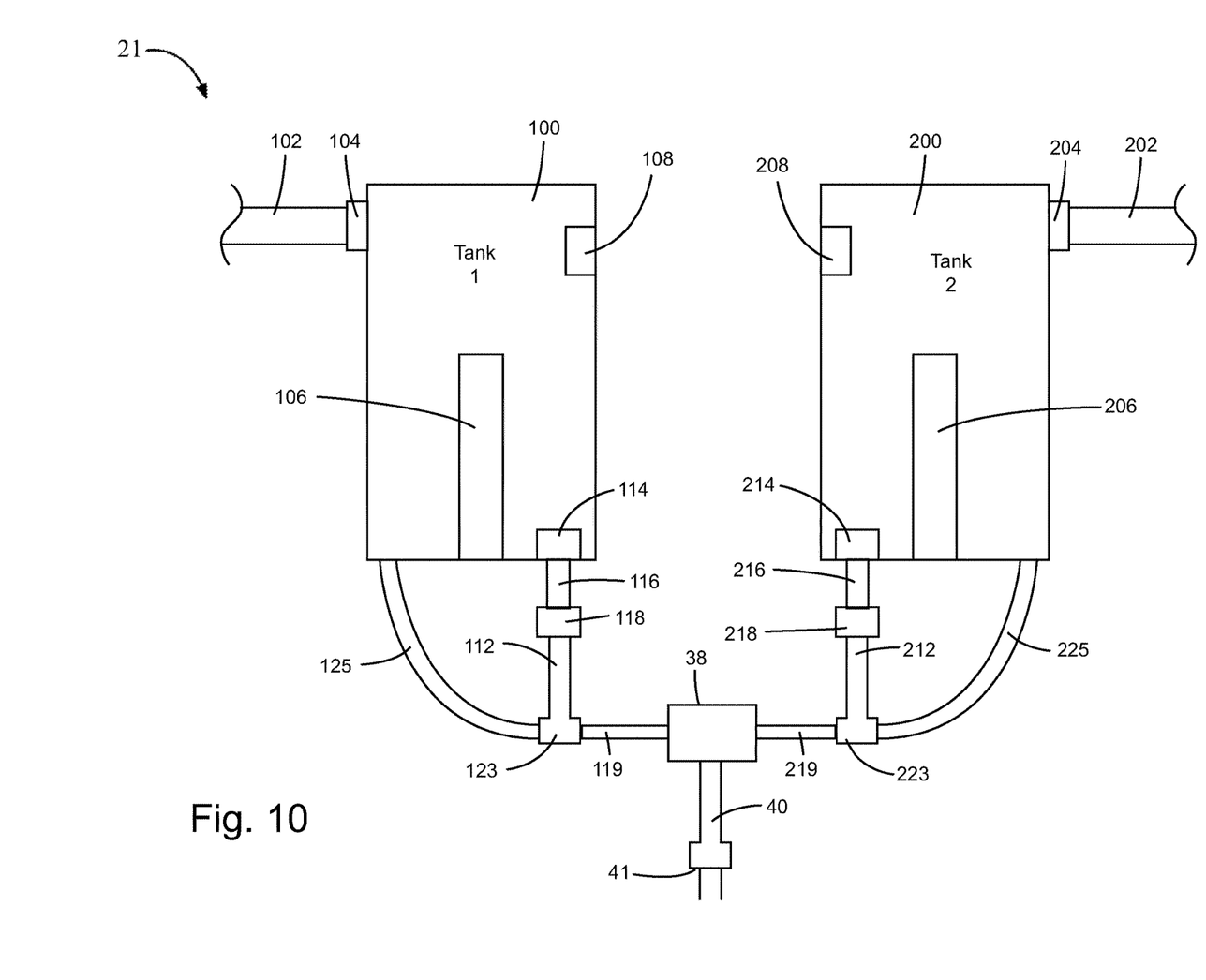
FIG. 10 is a plan view of the hydraulic system of a tea and water dispenser according to another embodiment of the present invention.

An alternate form of a tea dispenser 21, which utilizes valves and recirculation loops in place of the circulation pumps 120 and 220 of tea dispenser 20, is shown in a design view in FIG. 10. It shall be appreciated that all components of tea dispenser 21 are the same as those shown and described with respect to tea dispenser 20 in FIGS. 1-8, except where indicated below.

Tea dispenser 21 includes a first hot water tank 100, which maintains water at a first elevated temperature, and a second hot water tank 200, which maintains water at a second temperature which is higher than the first temperature. In one form, the first hot water tank 100 is larger in volume than the second hot water tank 200. In other forms, the second hot water tank 200 may be larger in volume than the first hot water tank 100 or the two may be of equal size. In one form, one of water tanks 100 or 200 may lack a heating element and utilize room temperature water.

For purpose of non-limiting example, when the tea dispenser 21 is utilized for tea, the water in the first hot water tank 100 is maintained at or slightly above/below 160° F., while the water in the second hot water tank 200 is maintained at or slightly below 212° F. By mixing water from the first and second hot water tanks (100 and 200 respectively) in differing ratios, hot water at any temperature between 160° F. and 212° F. can be quickly and accurately dispensed by dispenser 21 at a desired temperature and in a desired volume.

Each water tank 100/200 of dispenser 21 includes a water supply inlet 102/202 and a controlled supply valve 104/204 through which additional water is controllably supplied in order to fill and/or replenish the tanks using water supply line 34 (not shown) and water supply input 36 (also not shown). Each of the first hot water tank 100 and the second hot water tank 200 also includes a heating element 106/206. In other forms, only one tank may be heated. Also located within each of the first hot water tank 100 and the second hot water tank 200 are temperature sensors 108 and 208 which provide electrical signals to electronic controller 30 (not shown) which utilizes those signals to control the operation of heating elements 106 and 206 in order to precisely maintain the desired temperature within each of the first hot water tank 100 and the second hot water tank 200. The first hot water tank 100 and the second hot water tank 200 also include a water level sensor (not shown). Water level sensors provide electrical signals to electronic controller 30 (not shown) which utilizes those signals to control the operation of controlled supply valves 104 and 204 in order to maintain the desired volume of water within each of the first hot water tank 100 and the second hot water tank 200.

The first hot water tank 100 and the second hot water tank 200 are connected to first and second hot water outlet tubes 112/212 respectively. The first hot water outlet tube 112 and the second hot water outlet tube 212 are each fed by a first/second water pump 114/214, which supplies water from within the respective tank through a first/second output valve 116/216 and a first/second flow meter 118/218. In some embodiments, one or more of these water pumps may be omitted, particularly in the event of a tank being at room temperature, and gravity feed may be utilized. First and second water pump 114 and 214, first and second output valves 116 and 216, and first and second flow meters 118 and 218 are each in electrical communication with and/or controllably operated by electronic controller (not shown).

Water may be released for dispensation from either or both of the first hot water tank 100 and the second hot water tank 200 via the respective first or second hot water outlet tube 112/212. In order to do so using dispenser 21, the recirculation valves 123 and 223 need to be configured by electronic controller 30 (not shown) to direct the water passing down hot water outlet tubes 112/212 to pass into common chamber 38 via water dispense line 119/219. In one form, recirculation valves 123/223 are directional control valves used to divert the flow of hot water from hot water outlet tubes 112/212 as desired. However, recirculation valves 123/223 may be any other type of valve, or collection of valves, which provides the desired selective control of flow to electronic controller 30. Hot water is provided by the first/second water pump 114/214 from hot water tank 100/200 which passes through first and second flow meters 118 and 218 which measure and report the precise amount of water dispensed into the first and second hot water outlet tubes 112 and 212 respectively. Hot water is dispensed from the first and second hot water outlet tubes 112 and 212 into a common chamber 38 where the hot water is mixed together through turbulence before being dispensed out of the water discharge line 40 of dispenser 21. A solenoid, valve or the like 41 may be provided as part of water discharge line 40 to prevent dripping following a dispense cycle.

According to this alternative embodiment, to increase the consistency of the water temperature within the first hot water tank 100 and the second hot water tank 200 as well as the remainder of dispenser 21, dispenser 21 may utilize recirculation valves 123/223 in order to redirect the flow of hot water from the first/second water pump 114/214 and the first and/or second hot water outlet tube 112/212 back into their respective hot water tank 100/200 via recirculation loops 125/225. This arrangement is advantageous as it also recirculates the water within valves 116/216, flowmeters 118/218 and hot water outlet tubes 112/212. This reduces and/or eliminates the potential for water to remain their following a dispense cycle and fall to a lower or even room temperature, thereby causing difficulties in the dispenser dispensing hot water at a desired volume and temperature due to this reduced temperature volume of water. This circulation cycle of dispenser 21 may be controlled by electronic controller 30 (not shown) and may be operated continuously, intermittently, on a schedule so long as a dispense cycle is not occurring, or it may be operated at selected times, such as briefly prior to a dispensation cycle. As a result of these modifications, dispenser 21 may omit circulation pumps 120/220, temperature sensors 122/222 and water purge valves as they are not necessary. In a form where room temperature or lower temperature water is utilized, one recirculation valve and loop may be omitted, particularly where a gravity feed is utilized.

In another alternate embodiment, agitator 56 of dispenser 20 or 21 may be removed and/or supplemented by the quick and/or repeater operation or use by controller 30 of a solenoid, motor or other mechanism within the dispenser 20 or 21, such as the motor which drives or secures into place carousel 50 or drive screw 60. This operation creates vibrations within one or more of the plurality of interchangeable tea containers 44 and will free up and clogging or jams of the material contained therein.

While the invention has been illustrated and described in detail in the drawings and foregoing description, the same is to be considered as illustrative and not restrictive in character, it being understood that only the preferred embodiment has been shown and described and that all equivalents, changes, and modifications that come within the spirit of the inventions as described herein and/or by the following claims are desired to be protected. Hence, the proper scope of the present invention should be determined only by the broadest interpretation of the claims so as to encompass all such modifications as well as all relationships equivalent to those illustrated in the drawings and described in the specification.

What is claimed is:

1. A dispenser for dispensing a specified volume of water at a specified temperature into a waiting user vessel, comprising:
    a water line for receiving water from a water source;
    a first holding tank for storing water at a first predetermined temperature, the first holding tank having a first inlet for receiving water, a first temperature sensor, a first outlet having a first pump, and a first heater for maintaining water within the first holding tank at a first predetermined temperature;
    a second holding tank, separate from the first holding tank, for storing water at a second temperature different from the first predetermined temperature, the second holding tank having a second inlet, a second temperature sensor, and a second outlet having a second pump;
    a first recirculation valve in fluid communication with the first outlet, wherein the first recirculation valve is operable to selectively divert water from the first outlet between a first recirculation loop which returns water to the first holding tank or a first water dispense line;
    a water dispense port in fluid communication with the first water dispense line and a second water dispense line connected to the second outlet, wherein the water dispense port is configured to dispense water from the first holding tank and the second holding tank into the vessel;
    a first flowmeter positioned between the first outlet and the water dispense port and in fluid communication with the water from the first holding tank;
    a second flowmeter positioned between the second outlet and the water dispense port and in fluid communication with the water from the second holding tank;
    an electronic controller for receiving input from the first temperature sensor, the second temperature sensor, the first flowmeter and the second flowmeter and controlling the first pump, the second pump, and the first recirculation valve in order to recirculate water in the first holding tank and the second holding tank and subsequently dispense the specified volume of water through the water dispense port.

2. The dispenser of claim 1, wherein the first predetermined temperature is greater than the second temperature.

3. The dispenser of claim 2, wherein the first predetermined temperature is at least 20 degrees Fahrenheit greater than the second temperature.

4. The dispenser of claim 2, wherein the first predetermined temperature is between 202 and 212 degrees Fahrenheit.

5. The dispenser of claim 2, wherein the specified temperature is above the second temperature and below the first predetermined temperature.

6. The dispenser of claim 1, wherein the second temperature is room temperature.

7. The dispenser of claim 1, wherein the water source is a pressurized water supply line.

8. The dispenser of claim 1, further comprising a means for determining the boiling temperature of water and adjusting the first predetermined temperature.

9. The dispenser of claim 8, wherein the means for determining the boiling temperature of water and adjusting the first predetermined temperature comprises a barometer.

10. The dispenser of claim 1, wherein the first outlet further includes a first outlet valve and the second outlet further includes a second outlet valve, wherein each of the first outlet valve and the second outlet valve are selectively controlled by the electronic controller.

11. The dispenser of claim 1, wherein the first pump and the second pump are variable speed pumps.

12. The dispenser of claim 1, wherein the first recirculation valve comprises two or more distinct valves.

13. The dispenser of claim 1, further comprising a dispense valve controlled by the electronic controller to close the water dispense port.

14. The dispenser of claim 1, wherein the second holding tank includes a second heater for maintaining water within the second holding tank at the second temperature.

15. The dispenser of claim 14, wherein the second temperature is above 90 degrees Fahrenheit.

16. The dispenser of claim 1, further comprising a second recirculation valve connected to the second outlet, wherein the second recirculation valve is operable to selectively divert water from the second outlet between a second recirculation loop which returns water to the second holding tank or a second water dispense line and wherein the second recirculation valve is controlled by the electronic controller.

17. The dispenser of claim 16, wherein the second recirculation valve comprises two or more distinct valves.

18. The dispenser of claim 1, wherein the at least one of the first inlet and the second inlet is in fluid communication with the water line.

* * * * *